United States Patent
Patel et al.

(10) Patent No.: US 12,231,025 B2
(45) Date of Patent: Feb. 18, 2025

(54) ELECTRONIC PRESSURE REGULATING VALVE CONTROL FOR GENERATORS

(71) Applicant: Hamilton Sundstrand Corporation, Charlotte, NC (US)

(72) Inventors: Dhaval S. Patel, Schaumburg, IL (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 349 days.

(21) Appl. No.: 17/716,158

(22) Filed: Apr. 8, 2022

(65) Prior Publication Data
US 2023/0327520 A1    Oct. 12, 2023

(51) Int. Cl.
*H02K 9/19*     (2006.01)
*H02K 5/20*     (2006.01)
*H02K 9/193*    (2006.01)

(52) U.S. Cl.
CPC ............ *H02K 9/193* (2013.01); *H02K 5/203* (2021.01)

(58) Field of Classification Search
CPC ...... H02K 9/193; H02K 5/203; H02K 7/1823; H02K 11/30; H02K 9/19; G05D 23/1393
See application file for complete search history.

(56) References Cited

U.S. PATENT DOCUMENTS

| 4,514,652 | A | * | 4/1985 | Olson | H02K 19/38 310/90 |
| 4,851,723 | A | | 7/1989 | Barnhardt | |
| 5,014,596 | A | | 5/1991 | St. Martin | |
| 7,299,112 | B2 | | 11/2007 | LaPlante et al. | |
| 10,670,116 | B2 | * | 6/2020 | Han | H02K 7/183 |
| 2008/0073984 | A1 | * | 3/2008 | Down | H02K 9/19 310/52 |
| 2013/0134720 | A1 | * | 5/2013 | Fukasaku | F01C 1/0215 60/671 |
| 2016/0116074 | A1 | * | 4/2016 | Lemmers, Jr. | H02K 9/19 137/78.1 |
| 2016/0261173 | A1 | * | 9/2016 | Gugel | H02K 11/25 |
| 2023/0179064 | A1 | * | 6/2023 | Kelly | H02K 9/19 310/54 |

FOREIGN PATENT DOCUMENTS

| EP | 1903663 A1 | 3/2008 |
| GB | 2575495 A | 1/2020 |

OTHER PUBLICATIONS

Extended European Search Report dated Sep. 4, 2023, issued during the prosecution of European Patent Application No. EP 23167080.3.

* cited by examiner

*Primary Examiner* — Thomas Truong

(57) ABSTRACT

A method includes pumping coolant into a cooling system of a generator while the generator is generating electrical power. The method includes regulating flow into the cooling system using a pressure relief valve to recirculate a portion of the coolant back to an inlet of the pump. Using the pressure relief valve includes actuating the pressure relief valve based on input from the cooling system and/or from the generator.

20 Claims, 2 Drawing Sheets

ELECTRONIC PRESSURE REGULATING VALVE CONTROL FOR GENERATORS

BACKGROUND

1. Field

The present disclosure relates to pressure regulating valves, and more particularly to pressure regulating valves such as used in variable frequency generators (VFG) aboard aircraft and the like.

2. Description of Related Art

Currently independent cooling systems for aircraft generators require a hydraulic system that has a variable speed pump. The pump is typically a vane pump but can be any other pump type. Since the pump can operate at variable speed, the pump will have varying output flow dependent on its speed. To regulate the system pressure, a pressure regulating valve (PRV) is incorporated, which diverts some of the pump flow back to the pump inlet. The PRV actuates using a spring mass system to limit the flow of oil to the system. This pump and PRV system is passively controlled and must be sized to limit the pressure but also ensure that the system gets the proper cooling flow and the correct pressure.

This PRV and pump system must be sized to provide the proper cooling at low speed, however this results in a large amount of flow at high speed because the coolant system is passive. This drives inefficiency in the system by increasing machine windage in the generator and pump losses. Another major issue with this system is that pressure pulsations can occur due to the spring system. These pulsations could potentially damage the oil circuit if not accounted for in a specific design.

The conventional techniques have been considered satisfactory for their intended purpose. However, there is an ever present need for improved systems and methods for regulating pressure such as in cooling systems for generators. This disclosure provides a solution for this need.

SUMMARY

A method includes pumping coolant into a cooling system of a generator while the generator is generating electrical power. The method includes regulating flow into the cooling system using a pressure relief valve to recirculate a portion of the coolant back to an inlet of a pump that pressurizes the cooling system. Using the pressure relief valve includes actuating the pressure relief valve based on input from the cooling system and/or from the generator.

Actuating the pressure relief valve based on input from the cooling system and/or from the generator can include actuating the pressure relief valve based on pressure of coolant in the cooling system. Actuating the pressure relief valve based on input from the cooling system and/or from the generator can include actuating the pressure relief valve based on temperature of coolant in the cooling system and/or on temperature of a component of the generator, based on frequency of rotation of the generator, and/or based on power generated by the generator. Actuating the pressure relief valve based on input from the cooling system and/or from the generator can include determining an output of the pressure relief valve from a look up table (LUT) correlating input from the cooling system and/or from the generator to the output of the pressure relief valve. Pumping coolant into a cooling system of a generator while the generator is generating electrical power can include actuating a pump with a variable speed range input to the pump. Pumping coolant and regulating flow can include controlling both the generator and the pressure relief valve with a generator control unit (GCU).

A system includes a control unit with an input port for receiving input, and an electrically powered output port, and a controller operatively connected to receive input from the input port, and to control output from the electrically powered output port. The controller includes machine readable instructions configured to cause the controller to: receive input through the input port from at least one of a cooling system of a generator and/or from the generator itself, and regulate coolant flow into the cooling system, based on the input from the input port, using electrical power output from the output port to actuate a pressure relief valve to recirculate a portion of the coolant back to an inlet of a pump pumping the coolant to the cooling system.

The control unit can be a generator control unit (GCU) configured to control the generator. The system can include the generator operatively connected to the GCU to be controlled by the GCU. The cooling system can be in fluid communication with the generator to cool the generator. The pump can have an inlet in fluid communication with a source of coolant and an outlet in fluid communication to supply coolant to the cooling system. The pump can be connected to a main shaft of the generator to mechanically drive the pump at variable speed based on varying shaft speed of the generator. A gear set can mechanically connect between the main shaft and the pump to provide a speed range for input to the pump that is a fraction of speed range of the main shaft.

A bypass line can be connected in fluid communication to a main coolant line connecting the outlet of the pump to the generator. The bypass line can connect the main coolant line to the inlet of the pump. The pressure relief valve can be operatively connected to regulate flow through the bypass line. The pressure relief valve can be operatively connected to the output port for control of coolant flow through the bypass line.

The pressure relief valve can include a piston in a housing. An actuator can be configured to actuate the piston relative to the housing to control occlusion of an inlet of the housing and/or of an outlet of the housing. The actuator can be configured to receive power from the output port to control position of the piston.

The main coolant line can include a heat exchange output and a heat exchange input configured to connect the main coolant line in fluid communication with a heat exchanger. An external circuit bypass valve in an external circuit bypass line can connect in fluid communication between the main coolant line and the sump. The external circuit bypass line can connect to the main coolant line at a position upstream of the heat exchange output and downstream of the pump. The main coolant line can include one or more spray outlets positioned to spray coolant onto at least one of a permanent magnet of the generator, exciter of the generator, bearing of the generator, and/or end windings of the generator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
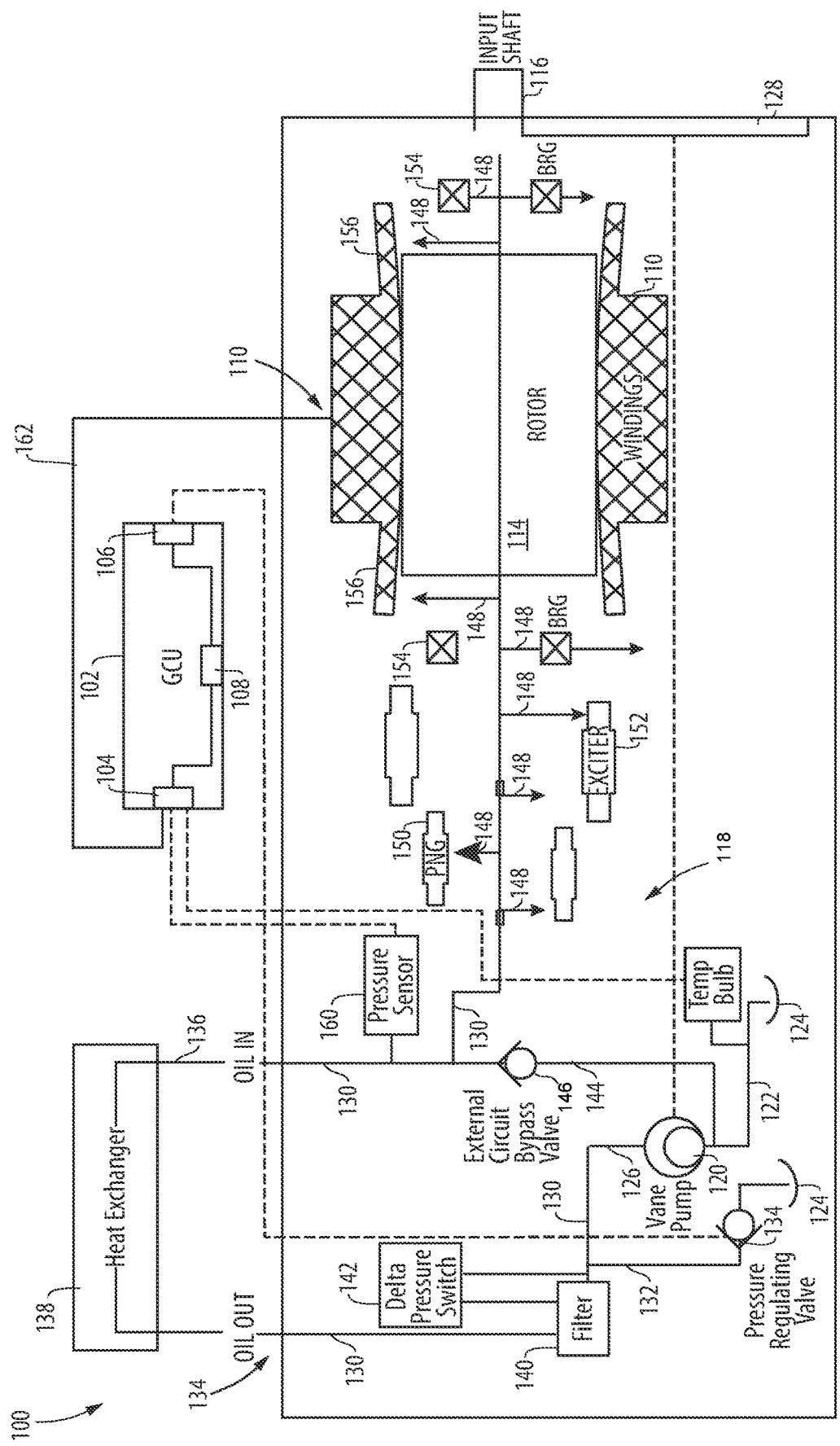
FIG. 1 is a schematic perspective view of an embodiment of a system constructed in accordance with the present disclosure, showing the generator and generator coolant system with its pump and controlled pressure relief valve.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to provide active control of coolant in generator cooling systems.

The system 100 includes a control unit 102 with an input port 104 for receiving input, an electrically powered output port 106, and a controller 108 operatively connected to receive input from the input port 104, and to control output from the electrically powered output port 106. The controller 108 includes machine readable instructions configured to cause the controller to perform methods as disclosed herein.

The control unit 102 is a generator control unit (GCU) configured to control the generator 110, i.e., to control the windings 112 and rotor 114 for power production given mechanical rotational input to the input shaft 116 from a prime mover. The cooling system 118 is in fluid communication with the generator 110 to cool the generator 110. The pump 120 of the cooling system 118 has an inlet 122 in fluid communication with a source 124, e.g. a sump, of coolant and an outlet 126 in fluid communication to supply pressurized coolant to the cooling system 118. The pump 120 is connected to a main shaft, i.e. input shaft 116, of the generator 110 to mechanically drive the pump 120 at variable speed based on varying shaft speed of the generator 110. A gear set 128 mechanically connects between the input shaft 116 and the pump 120, the connection is indicated by the dashed line in FIG. 1 between the gear box 128 and the pump 120, to provide a speed range for input to the pump 120 that is a fraction of speed range of the input shaft 116. For example, the speed range can vary in a ratio of 2:1 or 10:1, where the pump spins slower than the input shaft 116.

A main coolant line 130 connects the outlet 126 of the pump 120 to the generator 110. A bypass line 132 is connected in fluid communication between the main coolant line 130 and the inlet 122 of the pump 120. The pressure relief valve 134 is operatively connected to regulate flow through the bypass line 132. The pressure relief valve 134 is operatively connected to the output port 106 of the control unit 102 for control of coolant flow through the bypass line 132. The bypass line 132 recirculates coolant back to the inlet 122 of the pump 120. Controlling flow through the bypass line 132 in turn controls how much coolant flows out of the main coolant line 130 to cool the generator 110.

The main coolant line 130 includes a heat exchange output 133 and a heat exchange input 136 configured to connect the main coolant line 130 in fluid communication with an external heat exchanger 138, which cools the coolant upstream of where the coolant is distributed to cool the generator 110. The main coolant line 130 also includes a filter 140 and a delta pressure switch 142 at the positions indicated in FIG. 1 for determining when the filter 140 needs to be changed. An external circuit bypass line 144 connects in fluid communication between the main coolant line 130 and the sump 124. An external circuit bypass valve 146 is included in the external circuit bypass line 144 so that if the oil filter 140 and/or heat exchanger 138 are plugged, the external circuit bypass valve 146 can relieve pump discharge pressure and avoid over pressure that could otherwise occur. The external circuit bypass line 144 connects to the main coolant line 130 at a position upstream of the heat exchange output 133 and downstream of the pump 120. The main coolant line 130 includes one or more spray outlets 148 positioned to spray coolant onto at least one of a permanent magnet generator 150 of the generator 110, an exciter 152 of the generator 110, bearings 154 of the generator 110, and/or end windings 156 of the generator 110. The coolant sprayed from the spray outlets 148 returns to the source 124 of coolant, i.e. the sump.

Various sensors in the system 100 can provide input to the control unit 102 for controlling the pressure relief valve 134. A temperature sensor 158 in the inlet 122 of the pump 120 can be connected to the input port 104 of the control unit for temperature input for controlling the pressure relief valve 134. Similarly, a pressure sensor 160 in the main coolant line 130 can be connected to the input port 104 for pressure input to control the pressure relief valve 134. It is also contemplated that inputs from the generator 110 can be used for control of the pressure relief valve 134, such as temperature of a component of the generator 110 (from a temperature sensor in the generator 110), frequency of rotation or speed of the generator (from a speed sensor in the generator 110), and or from a current, voltage, or power sensor connected to sense electrical output of the generator 110. While FIG. 1 does not depict each of the sensors for sake of clarity, the sense line 162 can be used to connect sensors in the generator 110 to the input port 104 of the control unit. Those skilled in the art will readily appreciate that any suitable sensors or sensor locations can be used for input to control the pressure relief valve 134 without departing from the scope of this disclosure.

Figure 2:
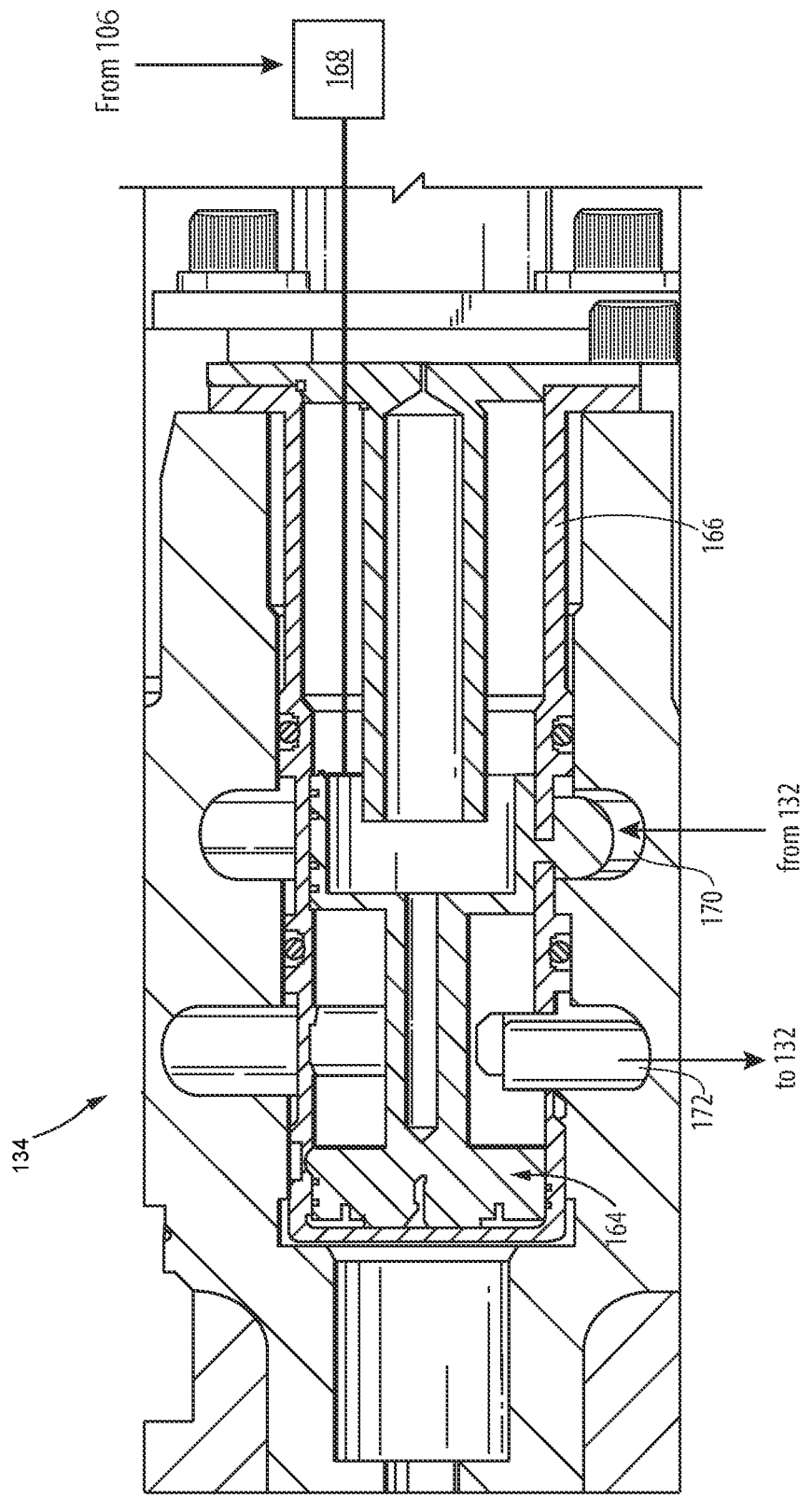
FIG. 2 is a schematic view of a portion of the system of FIG. 1, showing the pressure relief valve and actuator.

With reference now to FIG. 2, the pressure relief valve 134 includes a piston 164 slidably engaged in a housing 166. An actuator 168, such as a linear motor, solenoid, or the like, is connected to actuate the piston 164 relative to the housing 166 to control occlusion of an inlet 172 of the housing and/or of an outlet 170 of the housing 166. Changing the position of the piston 164 changes how much coolant flow passes through the housing 166 and thus through the bypass line 132 of FIG. 1. The actuator 168 is configured to receive power from the output port 106 of the control unit 102 of FIG. 1 to control position of the piston 164.

A method includes pumping coolant into a cooling system, e.g. cooling system 118, of a generator, e.g. generator 110, while the generator is generating electrical power. The method includes regulating flow into the cooling system using a pressure relief valve, e.g. pressure relief valve 134, to recirculate a portion of the coolant back to an inlet of the pump, e.g. pump 120. Using the pressure relief valve includes actuating the pressure relief valve based on input from the cooling system and/or from the generator.

Actuating the pressure relief valve based on input from the cooling system and/or from the generator can includes obtaining input, e.g. from the sensors described above, based on pressure of coolant in the cooling system, temperature of coolant in the cooling system and/or on temperature of a component of the generator, based on frequency of rotation or speed of the generator, and/or based on power, current, and/or voltage generated by the generator. Actuating the pressure relief valve based on input from the cooling system and/or from the generator can include determining an output of the pressure relief valve from a look up table (LUT) correlating input from the cooling system and/or from the generator to the output of the pressure relief valve. The LUT can be in machine readable format, e.g. in a memory the controller 108 of FIG. 1. Pumping coolant and regulating flow can include controlling both the generator and the pressure relief valve with a generator control unit (GCU).

The following lists potential advantages of systems and methods as disclosed herein. Coolant flow can be optimized for efficiency through the speed range of the generator. By using speed, current, and temperature feedback, the flow of coolant can be controlled. This control can allow the rotor cooling to be increased or reduced for operating conditions which allows for tighter control of the oil spray in the unit. The tighter control of the oil spray in the unit can reduce windage losses in the generator and allow for higher current densities with more optimized cooling. The system can work with all speed ranges without the need for additional complexity in the oil system to limit pressure. This concept can eliminate pressure pulsations from the spring-mass effect of passive valves as a design issue in the system. The bypass valve, e.g. external circuit bypass valve 146 in FIG. 1, can be eliminated, e.g. if a generator control unit (GCU) monitors pump discharge pressure, it could sense pressure increasing as a filter or heat exchanger plug and bypass oil back to the pump inlet using the pressure regulating valve 134 of FIG. 1.

The methods and systems of the present disclosure, as described above and shown in the drawings, provide for active control of coolant in generator cooling systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
pumping, using a pump of a cooling system, coolant into a main coolant line connecting an outlet of the pump to a generator while the generator is generating electrical power;
connecting an external circuit bypass valve in an external circuit bypass line in fluid communication between the main coolant line and a source of the coolant;
receiving an input through an input port of a control unit from at least one of the cooling system or the generator; and
based on the input, regulating a flow of the coolant into the cooling system using a pressure relief valve to recirculate a portion of the coolant back to an inlet of the pump, wherein using the pressure relief valve includes actuating the pressure relief valve based on the input from at least one of the cooling system or the generator.

2. The method as recited in claim 1, wherein actuating the pressure relief valve based on the input from at least one of the cooling system or the generator includes actuating the pressure relief valve based on a pressure of the coolant in the cooling system.

3. The method as recited in claim 1, wherein actuating the pressure relief valve based on the input from at least one of the cooling system or the generator includes actuating the pressure relief valve based on at least one of a temperature of the coolant in the cooling system or a temperature of a component of the generator.

4. The method as recited in claim 1, wherein actuating the pressure relief valve based on the input from at least one of the cooling system or the generator includes actuating the pressure relief valve based on a frequency of rotation of the generator.

5. The method as recited in claim 1, wherein actuating the pressure relief valve based on the input from at least one of the cooling system or the generator includes actuating the pressure relief valve based on the electrical power generated by the generator.

6. The method as recited in claim 1, wherein actuating the pressure relief valve based on the input from at least one of the cooling system or the generator includes determining an output of the pressure relief valve from a look up table (LUT) correlating the input from at least one of the cooling system or the generator to the output of the pressure relief valve.

7. The method as recited in claim 1, wherein pumping the coolant into the cooling system while the generator is generating the electrical power includes actuating the pump with a variable speed range input to the pump.

8. The method as recited in claim 1, wherein:
the control unit is a generator control unit; and
pumping the coolant and regulating the flow of the coolant include controlling both the generator and the pressure relief valve with the generator control unit.

9. A system comprising:
a pump configured to pump coolant into a cooling system;
a main coolant line connecting an outlet of the pump to a generator;
an external circuit bypass valve in an external circuit bypass line connecting in fluid communication between the main coolant line and a source of the coolant; and
a control unit with an input port configured to receive input, an electrically-powered output port, and a controller operatively connected to receive the input from the input port and to control output from the electrically-powered output port, wherein the controller includes machine readable instructions configured to cause the controller to:
receive the input through the input port from at least one of the cooling system or the generator; and
based on the input, regulate a flow of the coolant into the cooling system using electrical power output from the electrically-powered output port to actuate a pressure relief valve to recirculate a portion of the coolant back to an inlet of the pump.

10. The system as recited in claim 9, wherein the control unit is a generator control unit (GCU) configured to control the generator.

11. The system as recited in claim 10, further comprising the generator operatively connected to the GCU to be controlled by the GCU.

12. The system as recited in claim 11, further comprising the cooling system in fluid communication with the generator to cool the generator.

13. The system as recited in claim 12, wherein the inlet of the pump is in fluid communication with the source of the coolant.

14. The system as recited in claim 13, wherein the pump is connected to a main shaft of the generator to mechanically drive the pump at a variable speed based on varying a shaft speed of the generator.

15. The system as recited in claim 14, further comprising a gear set mechanically connecting between the main shaft and the pump to provide a speed range for input to the pump that is a fraction of a speed range of the main shaft.

16. The system as recited in claim 13, further comprising:
a bypass line connected in fluid communication to the main coolant line, wherein the bypass line connects the main coolant line to the inlet of the pump;
wherein the pressure relief valve is operatively connected to regulate a bypass flow of the coolant through the bypass line, wherein the pressure relief valve is operatively connected to the electrically-powered output port for control of the bypass flow of the coolant through the bypass line.

17. The system as recited in claim 16, wherein the main coolant line includes a heat exchange output and a heat exchange input configured to connect the main coolant line in fluid communication with a heat exchanger.

18. The system as recited in claim 17, wherein the external circuit bypass line connects to the main coolant line at a position upstream of the heat exchange output and downstream of the pump.

19. The system as recited in claim 16, wherein the main coolant line includes one or more spray outlets positioned to spray coolant onto at least one of a permanent magnet of the generator, an exciter of the generator, a bearing of the generator, or end windings of the generator.

20. A system comprising:
a control unit with an input port configured to receive input, an electrically-powered output port, and a controller operatively connected to receive the input from the input port and to control output from the electrically-powered output port, wherein the controller includes machine readable instructions configured to cause the controller to:
receive the input through the input port from at least one of a cooling system associated with a generator or the generator; and
based on the input, regulate a flow of coolant into the cooling system using electrical power output from the electrically-powered output port to actuate a pressure relief valve to recirculate a portion of the coolant back to an inlet of a pump pumping the coolant to the cooling system; and
wherein the pressure relief valve includes:
a piston in a housing; and
an actuator configured to actuate the piston relative to the housing to control occlusion of at least one of an inlet of the housing or an outlet of the housing; and
wherein the actuator is configured to receive power from the electrically-powered output port to control a position of the piston.

* * * * *